Figure 2:
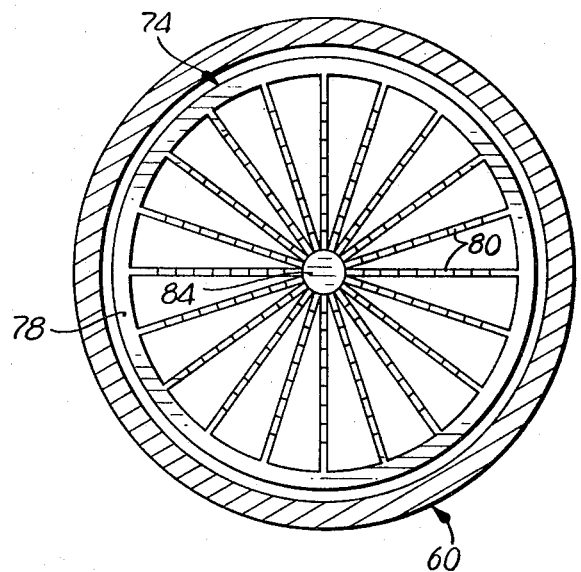

United States Patent [19]
Cottrell

[11] 3,751,922
[45] Aug. 14, 1973

[54] HYDRAULIC TRANSMISSION
[76] Inventor: Harold L. Cottrell, 4345 Brookie Ct., Columbus, Ohio
[22] Filed: Sept. 13, 1971
[21] Appl. No.: 179,842

Related U.S. Application Data
[62] Division of Ser. No. 839,158, July 7, 1969, Pat. No. 3,613,366.

[52] U.S. Cl. .................................. 60/349, 60/350
[51] Int. Cl. ........................................ F16h 41/04
[58] Field of Search ...................... 60/54, 330, 349, 60/350

[56] References Cited
UNITED STATES PATENTS
2,395,047  2/1946  Hanson .................................. 60/54
2,544,713  3/1951  Miller ..................................... 60/54
3,209,874  10/1965  Foster et al. ........................ 60/54 X Primary Examiner—Edgar W. Geoghegan
Attorney—Schmidt, Johnson, Hovey & Williams

[57] ABSTRACT

A hydraulic transmission unit including, within a sealed, fluid filled container, a pair of shafts rotatably mounted in the container and extending therefrom, a conical male impeller on one of the shafts and a conical female turbine on the other shaft, the shafts being relatively shiftable axially away from an initial, substantially spaced apart position into a position wherein the impeller and the turbine are in closer proximity than in the initial position.

1 Claim, 2 Drawing Figures

Patented Aug. 14, 1973 3,751,922

INVENTOR.
Harold L. Cottrel
BY
Schmidt, Johnson, Hovey & Williams
ATTORNEYS.

3,751,922

HYDRAULIC TRANSMISSION

CROSS REFERENCES

This application is a division of application Ser. No. 839,158, filed July 7, 1969, now U.S. Pat. No. 3,613,366 granted Oct. 19, 1971 and entitled "Hydraulic Transmission."

The present invention relates to the hydraulic transmission of power from a power source, such as a driving impeller, powered by an engine or the like, to a power output shaft, the output shaft having a turbine coupled therewith and disposed within the same fluid filled container as the impeller.

It is the most important object of this invention to provide, within a fluid filled container, a conical impeller and a conical turbine, each being rotatably carried by a shaft extending from the container, the shafts being relatively shiftable whereby to move the impeller and the turbine from an initial position wherein the shafts are in axial alignment to various other positions wherein the impeller and the turbine are in axial alignment but in closer proximity than in the initial position.

Another important object of the invention is to provide a fluid filled container having a pair of shafts rotatably mounted therein and extending therefrom, one of the shafts carrying a conical impeller in the nature of a male unit; the other shaft carrying a conical turbine in the nature of a female unit, the male impeller being provided with vanes exteriorly thereof, the female turbine being provided with vanes interiorly thereof and defining a cavity for receiving driving forces from the fluid as it is agitated by the male impeller, which impeller may be shifted toward and away from the conical female turbine.

The disclosed invention utilizes conical drive units provided with vanes and the shiftable nature of the male unit with respect to the female unit permits variance of the forces developed between the two units and within the fluid filled container. This construction allows smooth transmission of power from the impeller to the turbine, the various degrees of power being virtually unlimited and depending upon the proximity of the impeller and the turbine.

Thus an important object of the invention is to provide, in a hydraulic transmission, mechanism which affords an easy translation from low speed and power to optimum power and high speed with little if any waste of time and motion or sudden uncontrolled surges of power.

Figure 1:
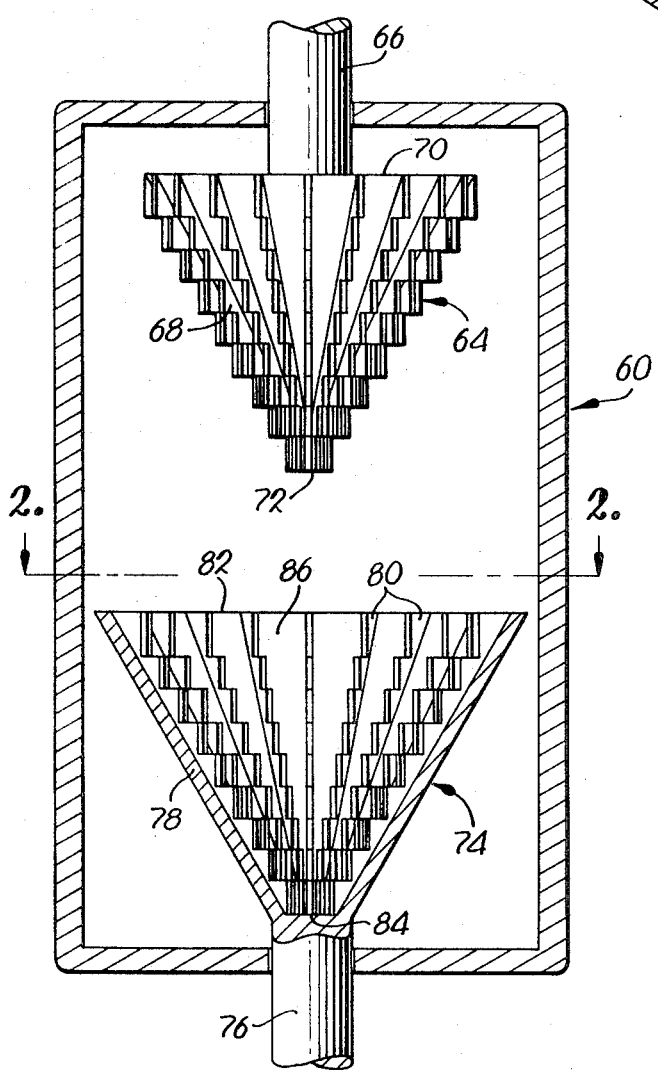

Other objects of the invention will become apparent from the following specification and accompanying drawing, wherein:

FIG. 1 is a top plan view of the hydraulic transmission, parts being broken away and in section to reveal details of construction; and FIG. 2 is a view taken along line 2—2 of FIG. 1.

Referring to the drawing, a sealed container 60 is provided which is filled with a suitable fluid 62. A conical male impeller 64 is positioned within the container 60 and is rotatably driven by a shaft 66 which extends from the container 60 and is driven by a suitable source of external power (not shown). The conical impeller 64 is provided with a plurality of vanes 68 on the exterior thereof, said vanes being in the nature of serrated strips which extend from the base 70 to the apex 72 of the conical impeller 64.

A conical female turbine 74 is also positioned within the container 60, said turbine 74 being carried by another shaft 76 which is rotatably mounted within the container 60 and extends therefrom.

The female conical turbine 74 is provided with an exterior wall 78, the outer surface of which is smooth, the inner surface thereof being provided with a pluraoity of vanes 80 in the nature of serrated strips which extend from the base end 82 of the turbine 74 to the apex 84 thereof, said vanes serving to define a central cavity 86 which is of a configuration complementary to the exterior of conical impeller 64. Thus, the impeller 64 is in the nature of a male unit and the turbine 74 is in the nature of a female unit, both of said units being of conical configuration.

The shafts 66 and 76 are in initial axial alignment and are retained in said alignment as the impeller 64 is shifted toward the turbine 74, such shifting movement of the impeller 64 varying the forces which are transmitted from the driving units through the fluid 62. The shifting movement of shaft 66 and thereby impeller 64 can be achieved by any suitable control means, such shifting accomplishing a change in the spacing of th impeller 64 with respect to the turbine 74, the variance in distance altering the fluid thrust which is delivered to the turbine 74 and thus varying the transmission of power therebetween and in the hydraulic transmission unit.

Thus, the conical configuration of the impeller and the turbine is utilized to maximize the efficiency of the hydraulic transmission unit, while the power flow therethrough is varied by the relative position of the impeller and turbine units whereby to achieve the maximum result.

Having thus described the invention, what is claimed as new and desired to be secured by Letters Patent is:

1. In a hydraulic transmission:
   a container adapted to be filled with fluid;
   a pair of shafts rotatably mounted in the container and extending therefrom, said shafts being in axial alignment;
   a conical male impeller in said container on one of said shafts;
   a conical female turbine in the container on the other shaft, said one shaft being shiftable with respect to the other shaft;
   a plurality of vanes projecting outwardly from the surface of said male impeller, said vanes being in the form of a series of serrated strips spaced around the exterior of the impeller and extending essentially from the base to the apex of said conical impeller; and
   a plurality of vanes extending inwardly toward the center of said conical female turbine, said vanes defining a central conical cavity complementary to the configuration of the male impeller, said vanes being in the form of a series of serrated strips spaced around the interior of said cavity and extending essentially from the base to the apex of said conical cavity.

* * * * *